(12) United States Patent
Temple

(10) Patent No.: US 12,050,035 B2
(45) Date of Patent: Jul. 30, 2024

(54) GRID INTERACTIVE WATER HEATER

(71) Applicant: Will John Temple, Placerville, CA (US)

(72) Inventor: Will John Temple, Placerville, CA (US)

( * ) Notice: Subject to any disclaimer, the term of this patent is extended or adjusted under 35 U.S.C. 154(b) by 600 days.

(21) Appl. No.: 17/096,071

(22) Filed: Nov. 12, 2020

(65) Prior Publication Data

US 2021/0123643 A1    Apr. 29, 2021

Related U.S. Application Data

(63) Continuation of application No. 16/554,322, filed on Aug. 28, 2019.

(60) Provisional application No. 63/024,088, filed on May 13, 2020, provisional application No. 62/921,413, filed on Jun. 13, 2019.

(51) Int. Cl.
| | |
|---|---|
| *F25B 30/06* | (2006.01) |
| *F25B 27/00* | (2006.01) |
| *F25B 30/02* | (2006.01) |

(52) U.S. Cl.
CPC ............... *F25B 30/06* (2013.01); *F25B 27/00* (2013.01); *F25B 30/02* (2013.01); *F25B 2400/13* (2013.01); *F25B 2400/16* (2013.01)

(58) Field of Classification Search
CPC .......... F25B 30/06; F25B 27/00; F25B 30/02; F25B 20/021; F25B 2200/123; F25B 2200/10; F25B 2400/24; F24H 1/185; F24H 1/201; F24H 9/2021
See application file for complete search history.

(56) References Cited

U.S. PATENT DOCUMENTS

| | | |
|---|---|---|
| 8,805,597 B2 | 8/2014 | Steffes et al. |
| 10,523,008 B2 | 12/2019 | Rive et al. |
| 2013/0178992 A1* | 7/2013 | De Graeve ......... F24D 19/1006 700/286 |
| 2017/0102165 A1* | 4/2017 | Brekken ............... F24H 9/2021 |
| 2018/0135886 A1* | 5/2018 | Liu ....................... F24H 1/0018 |
| 2019/0072296 A1 | 3/2019 | Kreutzman |
| 2019/0086121 A1* | 3/2019 | Branecky ................ F24H 1/185 |
| 2020/0333045 A1* | 10/2020 | Kernich ................ F24H 15/174 |

* cited by examiner

*Primary Examiner* — Elizabeth J Martin

(57) ABSTRACT

The present disclosure generally relates to hot water heaters 1 that are for the use of using electricity to store heat energy for current or later use. In some embodiments, the heat energy is stored in Thermal Energy Storage 7 (TES) to store excess electrical energy for the later use of heating water. The present disclosure also relating to several species of the invention which relate to the water tank 1 being a Grid Interactive Water Heater (GIWH). Some of the embodiments disclose methods of storing heat energy at a lower temperature than the hot water in the tank, which avoids being limited to phase change materials that phase change withing the narrow range of the hot water temperature. Another embodiment makes hydrogen for the use of heating water. Another uses the exhaust heat from a heat engine to improve the overall efficiency over common CHP water heaters.

21 Claims, 6 Drawing Sheets

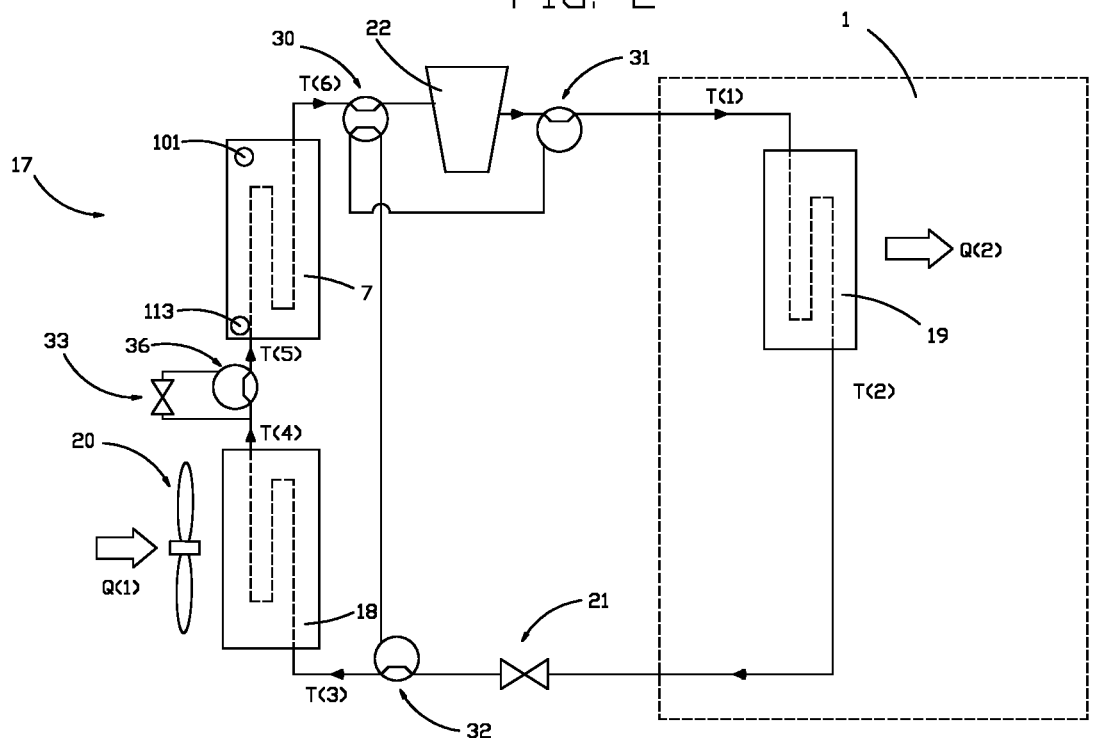
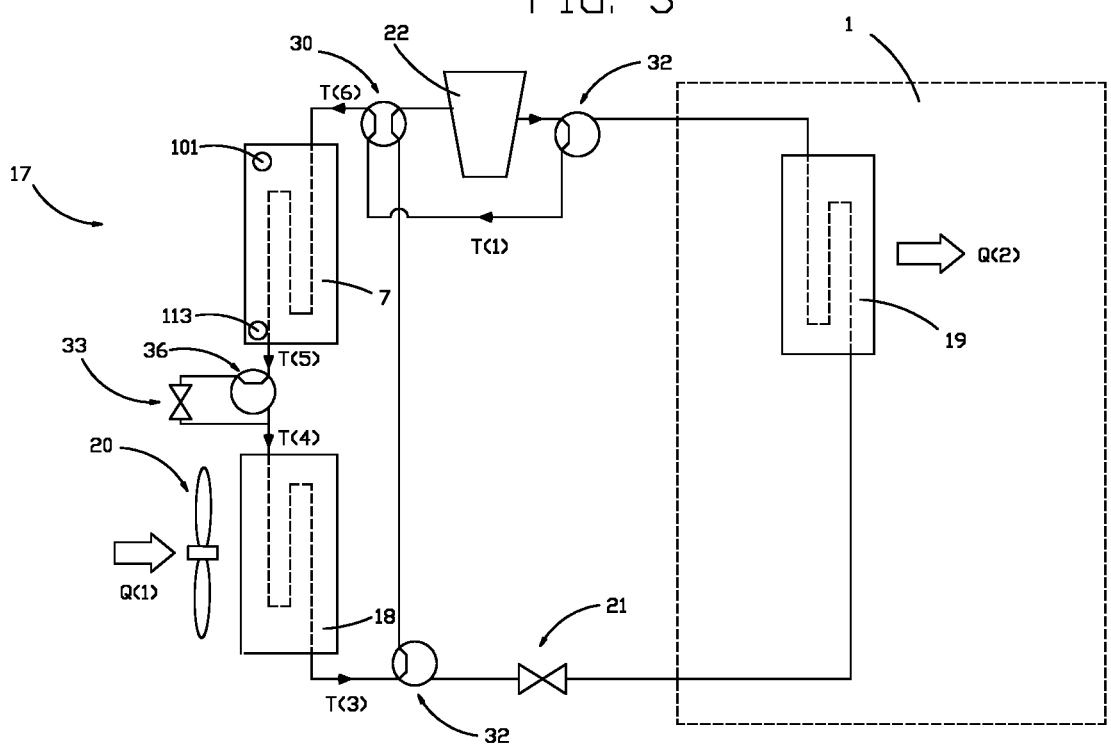

GRID INTERACTIVE WATER HEATER

CROSS-REFERENCE TO RELATED APPLICATIONS

This application claims the benefit of RPA Sr. Nr. 16/554,322 filed 2019 Aug. 28, 2019 by the present inventor and the benefit of PPA 63024088 filed 2020 May 13 by the present inventor, which are incorporated by reference.

BACKGROUND

FIELD OF INVENTION

The disclosed embodiments relate generally to utilizing thermal energy storage with grid interactive water heaters.

DESCRIPTION OF PRIOR ART

Thermal energy storage is currently in use in many applications, including the storage of heat for later use. In particular, thermal energy storage has been applied to solar water heaters to store heat energy for later use.

Also common are grid interactive water heaters, also known as GIWH (Grid Interactive Water Heaters). These water heaters can use electricity from an electrical grid to store hot water. The electrical energy is stored as heat for later use as heat energy.

US patent application 20190086121A1 to Brian Branecky, Yonggon Lee, and Kedar D. Dimbleh (Filed Sep. 19, 2018, Assignee: A. O. Smith) describes such a water heater. This application describes an electric and/or heat pump operated water heater that uses electrical energy to heat the water located inside a water tank to maintain the water within a temperature range. The electrical energy comes from a power source such as a grid, and the power grid distributes electrical energy to balance supply and demand at any specific time within a specific area.

Of course, owners of water heaters want hot water within a narrow range of temperatures. Further, the water generally needs to be output between the minimum temperature to inhibit microbiological growth and a maximum temperature below the scalding point. This is generally a small temperature differential that limits the amount of heat that can be stored in a hot water heater. The maximum energy that can be usefully used by the hot water heater is limited by the maximum temperature range the owner is willing to accept, and below the scalding point, multiplied by the specific heat of water and the mass of water in the tank. If the acceptable temperature range is narrow, then the amount of heat energy stored is concurrently small.

What is needed is to be able to store more heat energy within the acceptable temperature range, and to store the heat energy without needing an excessively large tank of water. Preferably, the hot water tank is not significantly larger than a common hot water heater.

Further, power grids are now comprising higher percentages of renewable power, including solar power. A solar power source is at its peak during daytime hours. However, the demand for hot water often comes at other times of the day and night. For example, many people take showers in the morning before the sun rises. So, what is needed is for a GIWH to be able to store energy supplied by the power grid during the day to supply heat energy for the next morning, and/or other times. A common and traditional hot water heater will lose temperature through conduction or other losses over time. Provided the power grid supplied heat energy to the water heater during the day, the temperature loss in the water tank overnight might send the temperature below the minimum temperature the owner has set, or is allowed, and the grid supplied heat would be mostly wasted before it was used.

A solution for this problem is to have enough storage capacity for daily or partial day thermal storage. Some thermal energy storage systems use phase change materials (PCM). Commonly used PCMs include hydrated salts, eutectic salts, and paraffins.

What is also needed is cost effective solutions that enable a large number of buildings to be converted to using electric power in place of fossil fuels for heating water. Electric power is on a path to using fewer fossil fuels for generation. Electrically powered heat pumps, in particular, can be as efficient as a fossil fuel water heater, even when using fossil fuel electrical generation. When using a renewable source, they can significantly reduce greenhouse gases.

BRIEF DESCRIPTION OF THE DRAWINGS

For a better understanding of the embodiments of the invention, as well as additional embodiments thereof, reference should be made to the Description of Embodiments below, in conjunction with the following drawings, in which like reference numerals refer to corresponding parts throughout the figures.

FIG. 2 illustrates a hot water heating system in accordance with some embodiments.

FIG. 3 illustrates a hot water heating system in accordance with some embodiments.

REFERENCE NUMERALS IN DRAWINGS

Figure 1:
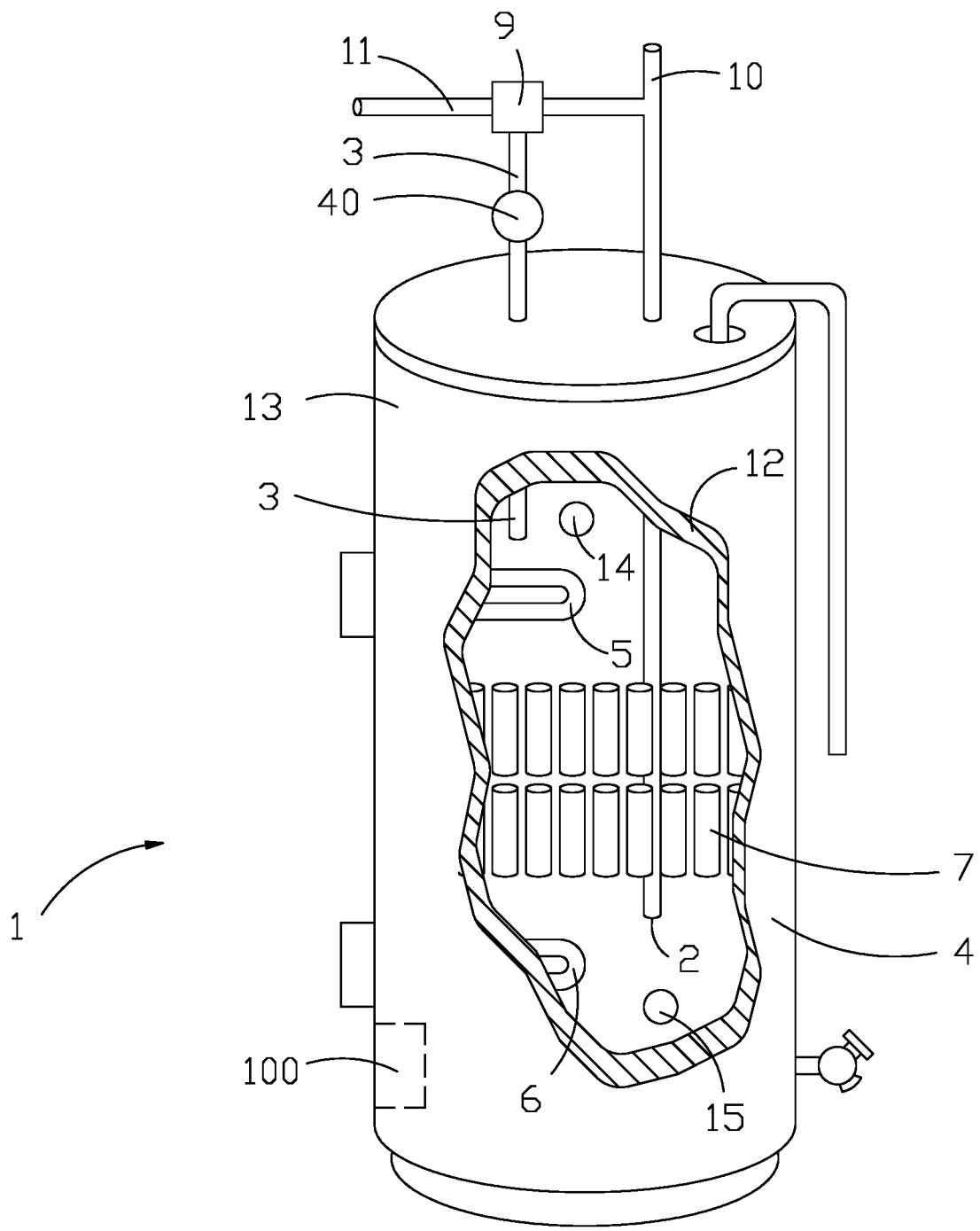
FIG. 1 illustrates a hot water heater in accordance with some embodiments.

1 Hot Water Tank
2 Inlet
3 Outlet
4 Shell
5 Heat Input 1 (Gas flame, Electrical resistance, Heat pump, etc.)
6 Heat Input 2 (Gas flame, Electrical resistance, Heat pump, etc.)
7 TES (Thermal Energy Storage)
8 PCM (Phase Change Material)
9 Mixing Valve
10 Water In
11 Hot Water Out
12 Insulation
13 Stored Water 14 Upper Temperature Sensor
15 Lover Temperature Sensor
16 Resistance Heater
17 Heat Pump
18 Heat Exchanger
19 Heat Exchanger
20 Fan
21 Pressure Reducing Device
22 Pressure Increasing Device
30 Valve
31 Valve
32 Valve
33 Pressure Reducing Device
34 Regenerator
36 Valve
37 Pump
38 Valve
40 Flow Sensor
71 Shaft
80 Water Separator
81 Hydrogen Storage Tank
82 Hydrogen Storage Tank Pump
83 Hydrogen Line
84 Hydrogen Line
85 Water Combiner (Engine, Fuel Cell, etc.)
86 Intake Airflow
87 Water Combiner Exhaust
88 Exhaust Heat Exchanger
89 Exhaust
90 Generator/Motor
91 Shaft
92 Shaft
93 Engine/Fuel Cell
94 Heat Exchanger
100 Control System
101 Sensor(s) (Thermometer(s), Flow Sensor(s), etc.)
102 Computing Device
103 Clock (Time(s))
104 Electrical Power
105 TES Heat Transfer System (Cooling or Heating)
106 Data
107 Network
108 Programming
109 Signal
110 Charge TES? (Determine if TES should be charged)
111 Charge TES
112 Process Data
113 Temperature Sensor
114 Determine Charge State
115 Radiant Heat Exchanger (Collector)
116 Communicate Data/Charge State
117 Receive Network Signals
118 Turn On
T(1) Temperature
T(2) Temperature
T(3) Temperature
T(4) Temperature
T(5) Temperature
T(6) Temperature
T(7) Temperature
T(8) Temperature
Q(1) Heat Energy In
Q(2) Heat Energy Out
Q(3) Heat Energy Out
A(1) Ambient Air In
A(2) Ambient Air Out

DETAILED DESCRIPTION OF THE EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known and/or common processes, mechanisms, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms may only be used to distinguish one element from another. For example, a first member could be termed a second member, and, similarly, a second member could be termed a first member, without departing from the scope of the present invention.

The terminology, used in the description of the invention herein, is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or", as used herein, refers to and encompasses any and all possible combinations of one or more of the associated listed items. It will be further understood that the terms "comprises" and/or "comprising," when used in this specification, specify the presence of stated features, steps, methods, operations, elements, and/or components, but do not preclude the presence or addition of one or more other features, steps, methods, operations, elements, and/or components thereof.

Embodiments of a thermal energy transfer system and/or device, and associated processes for using such devices are described. In some embodiments, the invention is an energy storage device. In some embodiments, the invention is a water heater for providing hot water for a building and for balancing a power grid. It should be understood, however, that some of the embodiments may be applied to other devices, such as, but not limited to, heating other fluids, providing heat to buildings, vehicles, industrial processes, etc.

In the examples about to be disclosed, many of the embodiments are for the use of using excess electrical energy to turn this energy into heat energy for immediate use, or to store it for later use. Many of the embodiments are for the use of using renewable electrical energy to turn this energy into heat energy for immediate use, or to store it for later use. Common to many embodiments are the common elements of water heaters, such as resistance heaters, heat pump heaters, oil, biomass, or gas-powered burners, and other common elements.

The term "ambient heat source" will refer to the ambient conditions outside of the device. For example, the ambient heat source of the heat pumps systems and devices of the present embodiments is generally the outside air. But due to the fact that the present embodiments can be cascaded, it may be the enclosed space of an outer level heat pump system. Heat energy can be transferred to or from the ambient heat source.

Water heaters can be considered a device. However, they are also a system of devices. Examples of the devices comprise heat pumps which in turn comprise pressure increasing and decreasing devices, and heat exchangers, such as evaporators and condensers.

Also common to many embodiments is a thermal energy system (TES) storage device. It is comprised of thermal mass. The TES comprises phase change materials (PCM) in some embodiments. In other embodiments, it comprises a mass of material that does not phase change in a normal operating range.

In most of the present embodiments, the TES storage is generally for the use of storing heat for less than 24 hours. The TES of the present embodiments are generally exclusive from storing heat, seasonally. To provide a measure of difference between a TES designed for daily thermal variations and TES, such as ground sources, designed for seasonal use, a daily TES will be defined as storing less than 7 days' worth of heat storage for its application. The reason for why this definition is not 1 day is that it may be beneficial for a TES to store heat energy from a period of excess or high energy production for heating over a period of a few days, even if its primary function is to store heat for less than one day.

In an aspect of the invention, magnetic (magnetocaloric) effect can be used to heat. The present embodiments comprising heat pumps generally relate to compression vapor cycles, but the heating systems can utilize the magnetic effect, thermoelectric (Seebeck) effect, or the Brayton cycle.

In an aspect of the invention, heat pumps can be used to exchange heat energy between the ambient environment and an enclosed material, and/or a TES. For this disclosure, a first heat pump is defined as the main heat pump that exchanges heat energy between the ambient environment and an enclosed material. This may also be referred to as the "main" heat pump. A second heat pump is defined as the heat pump that exchanges heat energy between the ambient environment and a TES. This is just for the purpose of avoiding confusion.

In an aspect of the invention, the "first" or "main" heat pump uses a fluid 14 to transfer heat energy. This is generally refrigerant, as Rankine cycles are generally more efficient than Brayton cycles. But the fluid may be any common fluid for transferring heat energy, such as air or helium. The invention is not limited to one fluid, but individual embodiments may be, and may also be exclusive to some alternative fluids. The difference with a Brayton cycle is that the working fluid/gas 14, which could be a refrigerant, does not undergo a phase change operation. Vapor-compression heat pumps generally utilize the Rankine cycle which uses a phase change operation.

Heat pumps may be cascaded. Cascading heat pumps are generally more efficient and have a higher COP than a single heat pump that maintains the same temperature difference. Like Rankine cycles, Brayton cycles may also be cascaded, but it is better for a Brayton cycle to include regeneration. A Brayton cycle with regeneration may compete with a Rankine cycle, in terms of COP, depending on the reversibilities in real world devices for low temperature source differentials. Brayton, Rankine, and other common heat pumps may be cascaded with each other, and may utilize regeneration.

In an aspect of the invention, the fluid generally flows in tubing, piping, or ducting, which may also be referred to as "lines". For example, the fluid may be refrigerant flowing in refrigerant lines.

In an aspect of the invention, regenerators are common elements in some heat pump systems. The embodiments of this disclosure are compatible with heat pumps utilizing regenerators.

In an aspect of the invention, devices that consume electrical energy are sometimes referred to as "load" devices of a network of devices when they do not turn the stored energy back into electrical energy. Many of the present embodiments are considered "load" devices that comprise storage devices, such as TES, in regards to an electrical grid and network.

In an aspect, a washing machine is often used as an example of a load device. In the case of a washing machine, a user obviously wants to move wet washed clothes into a dryer in order for them not to mold. Thus, use of a washing machine as a device whose operation can be delayed to a time when a user may not be home, nor aware of the operation, is not a desirable characteristic. By contrast, all a user wants of a hot water heater is for it to deliver hot water within a narrow range of temperatures. A user does not care when it is charged. A hot water heater is thus a preferable load device for connecting to an electrical power grid as a load and/or storage device.

Attention is now directed towards embodiments of the device.

FIG. 1 illustrates a water heater comprising TES. This embodiment comprises the common elements of a Tank 1, an Inlet 2, an Outlet 3, a Shell 4, Water 13, one or more Heating Devices (5 and 6). These are not shown in detail as these are widely known, used, and are common elements in hot water heaters. Likewise, Heating Devices may comprise heat pumps, electric resistance elements, fossil fuel burners, solar energy, and other common elements, and are not shown in detail, as they are common elements. In an aspect, heating devices may be used in any combination. For example, a hot water heater may comprise a heat pump in combination with a fossil fuel burner.

In an aspect of the invention, a heat pump of the water heater system may comprise a compressor, or any pressure increasing device. In another aspect of the invention, a pressure reducing device may comprise a throttle, which may comprise a capillary tube, an expander, turbine, or any pressure reducing device. Also, the expander may be linked to the compressor or pump. The link can be physical, such as a drive shaft or axel 71 (FIG. 7, 11), or the link can be electrical, or any common method of transferring work energy.

FIG. 1 also illustrates a water heater, with the addition of Thermal Energy Storage (TES) 7. In an aspect of the invention, TES materials are common. It is also common for one or more phase change materials PCM to be used in TES (thermal energy storage) systems. As is well known, phase change materials can provide much greater thermal energy storage for a given mass and can provide heat transfer at a consistent temperature during the phase change.

In this example and embodiment, the TES comprises a phase change material. In this example the phase change would occur at a desired hot water temperature of 136°. But any suitable temperature will suffice. If the temperature of the phase change of a PCM is above the environment with which it exchanges heat energy, then the PCM will eventually be cooled below its phase change temperature. The PCM can provide sensible heat storage when not at its phase change temperature.

A list of alternative means for heating PCM of a TES to "charge" the device comprises, but not limited to, a reverse Rankine cycle, vapor compression, a reverse Brayton cycle, a reverse Stirling cycle, electric resistance, magnetic, thermoelectric, fossil fuel burning, fuel cell, or any other common form of heat addition. Some embodiments may exclude some of these alternatives.

In an aspect of some of the embodiments of the invention, the size of the TES, and the materials of the TES, depend on the environmental conditions into which it is installed. It is important to note that the size and materials of the TES have not only cost, but also associated energy and possible global warming impact in their production. So, the determination of the proper size, design, and material is determined by many factors.

Methods of Adding PCM TES to a Water Tank

In an example and embodiment, FIG. 1 illustrates a hot water tank 1 where the PCM 8 based TES 7 is added inside the tank. In this embodiment, the TES displaces water within the tank and heat energy exchanges directly between the tank water and the TES. For a given volume, a tank of water with a TES comprising PCM can store more heat energy compared to just water.

The PCM needs to have a phase change temperature above the minimum set temperature of the water, and below the maximum set temperature of the water. One suitable phase change material is sodium acetate +10% graphite, which has a melting point of 58 degrees C. (136 degrees F.).

The PCM can be charged during times of excess electrical power generation, and/or more economical power pricing, and/or lower carbon power generation, to melt the PCM. Once the PCM is fully melted, the temperature of the tank can be increased until the maximum temperature is reached. The TES can then provide some sensible heat storage, and a larger amount of latent heat storage.

In a method, the water tank can provide hot water for a longer period of time before being reheated compared to a tank of water with no TES. In an embodiment and method, PCM based TES enables a water tank to store solar power generated electrical energy from the grid, usually generated during the day, to deliver hot water through the night and early morning.

In an aspect of the invention, renewable energy sources often do not provide consistent power and there can be an excess. Hot water heaters of the present invention provide means to use any excess power generation and turn it into thermal energy for later use. For example, if there exists enough PV solar power for morning and late afternoon electrical demand, then there will generally be an excess of PC during peak sunlight hours around noon. Hot water heaters of the present invention can use this excess to store energy as heat energy. In an embodiment, the hot water heater is a grid interactive water heater (GIWH) comprising TES with PCM.

For purposes of illustration, examples and embodiments are described that may use solar PV technology for energy generation. However, it should be appreciated that embodiments of the present invention are not limited to such implementations. For example, in some embodiments, alternative types of energy generation technologies (e.g., wind turbine, solar-thermal, geothermal, biomass, hydropower, etc.) may be used. One of ordinary skill in the art will recognize many modifications, variations, and alternatives.

In another embodiment and method, the TES is external to the inside of the hot water tank. The TES may comprise PCM. FIG. 2 illustrates an embodiment comprising a heat pump system 17. The heat pump system comprises a TES 7 inserted into an otherwise common heat pump comprising pressure changing devices 21 & 22, and heat exchangers 19 & 20. In this embodiment, the TES is downstream of heat exchanger 18, which is an evaporator in a vapor compression cycle. The TES in this embodiment is outside of the water tank. The TES does not reside in the water tank, and in an advantage, there is no direct contact between the TES material and the water in the water tank. In an embodiment, the heat pump comprises a vapor compression cycle, and refrigerant, or other phase change material flows through the TES to exchange heat with the PCM in the TES. (In this case the refrigerant fluid and some the TES material both comprise phase change materials, but they are different materials. The phase change material in the TES will be referred to as PCM, and the phase change fluid that completes the heat pump cycle with be referred to as refrigerant to differentiate the two.)

In another advantage, the phase change material of the present embodiment can be at a lower temperature than the minimum set temperature of the hot water tank. This gives a broader choice of PCM from which to choose.

Charging the TES may be accomplished with the following list of alternative methods: conduction and/or convection, heat pump cycles, absorption/adsorption cycles, solar gain, magnetic or magnetocaloric effect, thermoelectric (Seebeck effect), heating with fossil fuels, or heating with left over heat (such as combined heat and power—CHP), or any common method of transferring heat energy. These methods may be combined.

In an aspect of the invention, gas heating cycles (reverse Brayton cycles) can be open or closed. In an embodiment the TES Heat Transfer System 105 is open. In another embodiment, it is closed.

The reverse Rankine cycle is generally favored over gas heating cycles, such as in FIGS. 2-6, and 8, as vapor compression cycles have higher COP's and, thus, greater efficiencies. Both of these cycles have COP's that go to infinity by theory when the outside ambient air temperature is the same as the temperature of the water heater or the TES.

In an aspect of the invention, friction and other reversibilities may be more important at small temperature differentials. Thus, a gas cycle using air may be more competitive with a vapor compression cycle at low temperature differentials, and should be considered.

Figure 5:
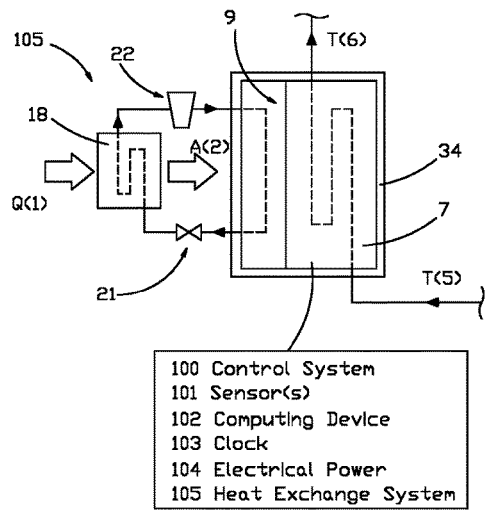
FIG. 5 illustrates a TES in accordance with some embodiments.

FIG. 5. Illustrates a TES heating system 105 and embodiment comprising a vapor compression cycle using a compressor 22 and a throttle 21. In this case, the working fluid is a refrigerant, but may be any suitable gas or fluid.

Provided a refrigerant is used, the compressor 22 drives a phase change cycle. Provided air, or another gas is used, the cycle does not comprise a phase change. If a phase change occurs, it is a vapor compression cycle. Otherwise, it is gas heating cycle.

Figure 6:
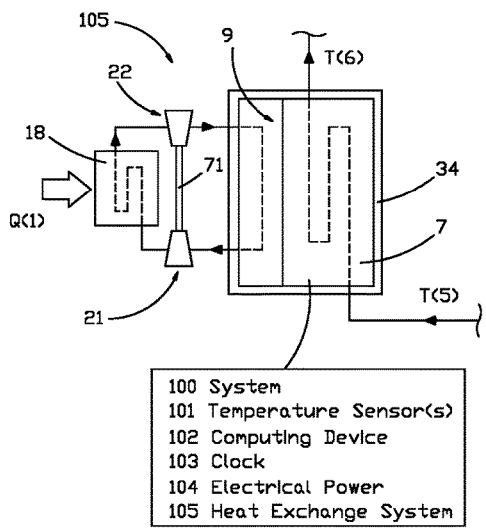
FIG. 6 illustrates a TES in accordance with some embodiments.

FIG. 6. Illustrates a TES heating system 105 and embodiment comprising a gas heating cycle using a compressor 22 and a turbine 21. In this case, the working fluid is air, but may be any suitable gas or fluid.

In the embodiment shown in FIG. 6, a shaft 71 is depicted. But the means to connect a pressure increasing device to a pressure decreasing device, such as a compressor and turbine, or two fans, can be means other than a shaft. For example, and in an embodiment of the invention, the turbine in these embodiments may drive an electric generator which in turn is connected electrically to an electric motor of the turbine.

In an aspect of the embodiment of FIG. 6, and all embodiments utilizing a gas heating cycle using air, the cycle may be an open cycle. Wherein the heat exchanger (18 in FIG. 6) that exchanges heat with the outside air is eliminated. Elimination of heat exchanger 18 in FIG. 6. would be desirable in climates where the outside temperature is cold enough to cause frosting problems in this embodiment that provide heat energy to the TES.

FIGS. 5 and 6 also illustrate embodiments comprising a type of cascaded heat pump cycle, provided the TES PCM phase changes at a temperature below the temperature of the hot water in the tank. In these embodiments, heat energy is cascaded from the TES heat pump to the main heat pump through the TES, which takes the place of a heat exchanger in a traditional cascaded heat pump. An advantage is that the TES, particularly when comprising PCM, to run asynchronously, which is to say that the heat energy may be added and removed to and from the TES at different times.

In an embodiment and method, a heat pump comprises a cascade of a plurality of heat pumps with a first heat pump comprising an open reverse Brayton cycle which transfers heat energy to a second heat pump as a source of heat energy. The first heat pump being an open cycle eliminates the problems that can occur from frosting of the evaporator (or heat exchanger) coils that could occur in a common heat pump when running in cold temperatures. In an aspect, provided the first open heat pump runs at a small temperature differential, it could run at a favorable COP. Any of the depicted heat pumps can be replaced with cascaded heat pumps.

Control systems are common (however, some methods and embodiments of the control system of the present invention are novel). The switching of the valves between the positions shown in FIG. 2 to the positions shown in FIG. 3, or vice versa, are controlled by a control system. Likewise, powering the pressure increasing device (pump) is controlled by a control system. Any common method of switching the valves may be used, such as manual or electric.

In a method of the present embodiments, a control system 100 determines when to charge the TES. In an aspect of the embodiment of FIGS. 2 and 3, other methods of controlling and cooling or heating the TES described else ware in the disclosure, or any common method, may be utilized.

Methods of Tank and/or TES Control

Regarding determining when to add heat to the water and/or the TES of the water tank system, and by how much, a control system 100 can make these determinations based on signals 109 and data 106. Data comprises one or more of the following list of alternatives: one or more temperatures, time of day, calendar, cost of electricity or fuel, fuel type and/or data such as emission data, future requirements and/or resource allocations, an identifier, previously set values (such as hi and/or low temperatures), flow rates, and any state of the heating system such as whether or not it or some elements are on, if on, or for what temperature it is set. In a method, the control system determines if the TES and/or tank should be charged, or not, and by how much and/or for how long. A control system can also determine and how much outside resources should be used and when, such as fuel or electricity, The water heater and/or TES may use controls that are smart controls or use simpler controls. Smart devices are common and generally comprise computing devices which, generally comprise chips (CPU, microprocessor, etc.), at least one clock, memory, instructions, data, and communication means such as wired or wireless connections. A control system 100 may be connected to one or more networks 107, such as the internet, or other common means to communicate. A TES control system can be built into the control systems for the water heater, or it can just control the TES separate from the main system.

In an embodiment, the water tank and/or TES are controlled by simple means. Simple means can comprise common controls that let a user or installer set and/or program a controller 108 to turn on or direct elements of the present invention to run at preprogrammed times and/or levels. However, smart controls are preferable.

In an aspect, a control system may be part of a larger control system. For example, a building, such as a house, can have a control system that controls a water heater of the present invention, as well as other devices. A control system may also be a node in a network, as is common in network topology, and may comprise parent and child nodes. The control system may be part of a larger network, such as the power grid.

In an aspect, communication between the various elements involved in energy/power management may be achieved through wireless (e.g., Bluetooth, ZigBee, WiFi) or wired communications. In some embodiments, this communication can occur through use of a power management Message Bus System (MBS), which can facilitate communication between the control system of the present water heaters and various elements of a network. The MBS can operate according to a subscribe/publish model, with each respective device functioning as a subscriber and/or publisher, utilizing a topic of a message being communicated.

Figure 9:
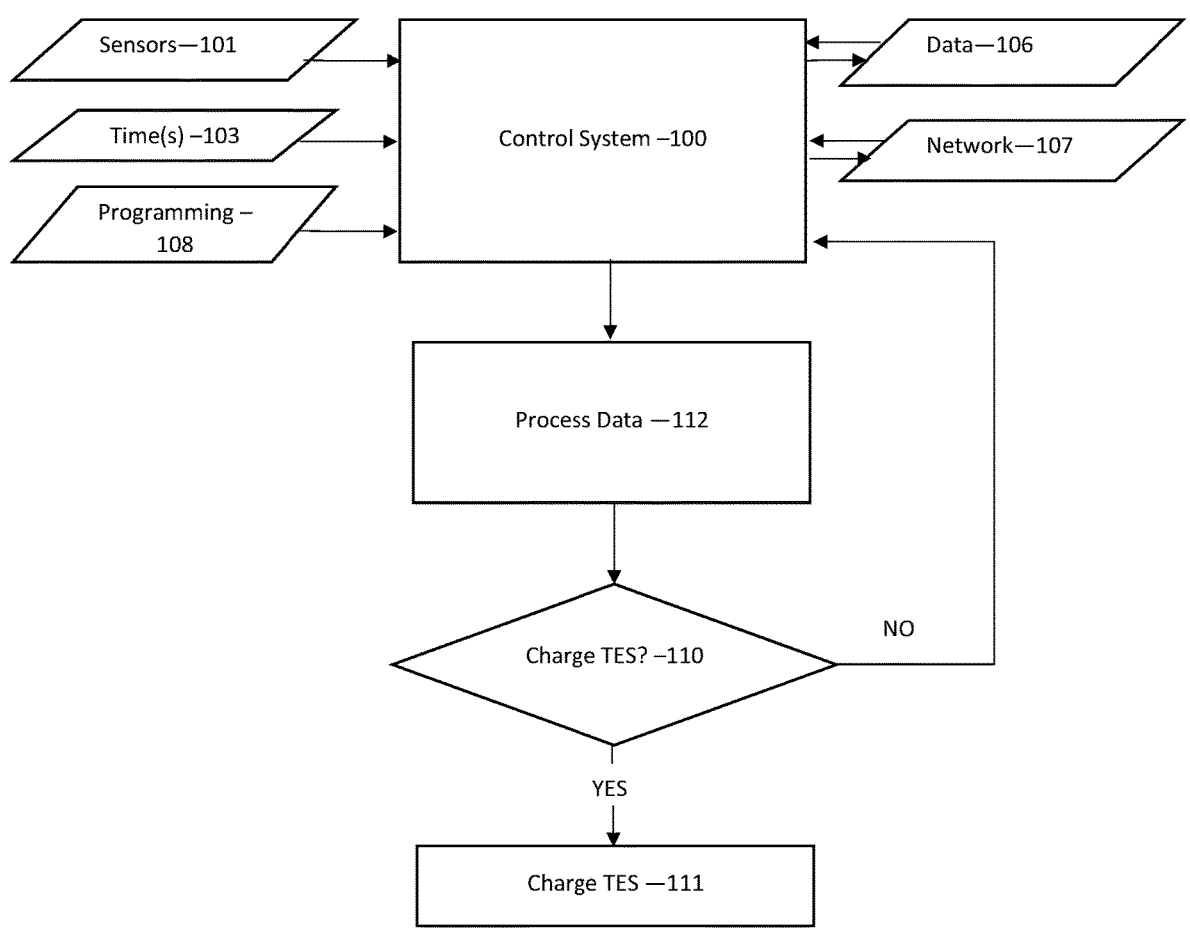
FIG. 9 illustrates a method in accordance with some embodiments.

In a method to control the charging (heating) of the tank and/or TES, the method comprises determining if the tank and/or TES needs to be charged, actions to take, and when to take the actions, as illustrated in FIG. 9. In an embodiment, determining if the tank and/or TES needs to charge 110 comprises receiving temperature data or signals. In an embodiment, some temperature data is received from one or more thermometers that measure the temperature of the one or more TESes. In an embodiment, some temperature data is received from one or more thermometers that measure the temperature of the refrigerant (at one or more of $T(\mathbf{1})$, $T(\mathbf{2})$, $T(\mathbf{3})$, $T(\mathbf{4})$, $T(\mathbf{5})$, $T(\mathbf{6})$, etc., or any combination). In an embodiment, some temperature data is received from a thermometer that measures the temperature of the ambient outside air. In an embodiment, some temperature data is received from one or more thermometers that measures the temperature of the inside water (within the tank), and/or at the one or more water inlets and outlets.

In an embodiment, a control system determines and stores some data values in memory. In an aspect of some embodiments and methods of the invention, the control system can be connected to a network, such as the internet, that provides it with the current time. Or a user can set a clock of the control system.

In a method, the control system learns the phase change temperature of the TES material by determining that the TES has stayed at or near a constant temperature for a time threshold, when it is also determined that the water temperature(s), heat input amounts or running times, and/or other operating conditions, should be transferring heat energy into or out of the TES. In a method, the control system of the TES learns from a previous time range's data, such as a previous day's data, how to most efficiently charge the TES. In an aspect, running averages can be used.

In a method for embodiments that heat a water tank and/or TES, the control system can use common methods for combating frost buildup in heat pumps.

In an embodiment, the hot water tank comprises a control system 100 that comprises one or more of the following elements: sensor(s) 101, time sensing means (clock) 102, calendar, and computing device 102. Sensors 101 may comprise one or more of the following: temperature sensors, flow sensors, and other common sensors. A computing device may comprise common computing elements as well as means to receive a signal or data from an outside source for the use of changing the state of heat transfer with the outside environment. An example of outside data would be electricity rates. The use of the control system is to control the heat transfer into or out of the water heater and the TES. The computing device and/or control system may communicate across a network 107, which may be the internet, to send or receive data 106 to or from an outside source. In an aspect, data may be data that flows across a network, or is data that resides in the computing device and/or control system. Computing systems, data, and networks are common elements.

In an aspect of the invention, the control system can be within or adjacent to the water heater or TES, or it can be incorporated into a control system for a whole building. It is within the skill of a person skilled in the art to incorporate a control system.

In embodiments with control systems, the control system controls the heat transfer into and out of the TES and water heater. The control system uses one or more methods of determining when to add heat from the heat providing elements, and/or the TES.

In an aspect, the temperature of a TES comprising PCM does not by itself indicate the amount of heat energy stored in the TES, if the temperature is at the phase change temperature. At this temperature, it is unknown how much of the phase change material is in one phase or the other. In an embodiment, a control system may determine or estimate how much energy is stored in the PCM by calculating how much heat energy has been added or discharged since the last time the PCM and TES was at a temperature above or below a threshold of temperature differential from the phase change temperature.

In an embodiment illustrated in FIG. 1, the embodiment comprises a flow sensor 40, temperature sensors 14-15, and a control system 100. In this illustration, the flow sensor is on the hot water output side, but the sensor can also be on the cold input side as a water heater is a flow through device and the flow out generally equals the flow rate in. This embodiment also comprises two temperature sensors 14 and 15 (thermometers). Temperature sensor 14 measures the temperature of the water flowing out of the tank, and temperature sensor 15 measures the temperature of the incoming cooler water. In as aspect, these sensors can be in the tank near the inlets and outlets, or in the water pipes.

The control system 100 uses information from these sensors to determine how much heat energy has flowed into or out of the tank. The control system can determine how much heat storage capacity remains and/or is available for charging or discharging by knowing the full storage capacity of the tank and how much heat energy has been charged and/or discharged since the temperature of the TES was last at a temperature other than the phase change temperature. In an aspect, a charge state comprises an amount of the total heat storage capacity of the water tank and/or TES.

In an aspect, a plurality of temperature sensors could be used to determine the flow rate. The water in the tank is conductive, and the temperature will settle into a gradient. Temperature data can be used to determine a flow rate from the change in gradient. In an embodiment and method, a plurality of temperature sensors is used to determine the flow rate of water through the tank.

In an aspect, the control system can learn the heat storage capacity of the tank by determining the amount of heat energy it took the last time, or first time, or another time interval, that the tank was heated from its low temperature set point to its high temperature set point. Likewise, the control system can learn the heat storage capacity of the TES with PCM by determining the amount of heat energy it took the last time, or first time, the tank was heated from a temperature below a temperature differential of the melting point to a temperature above.

Figure 11:
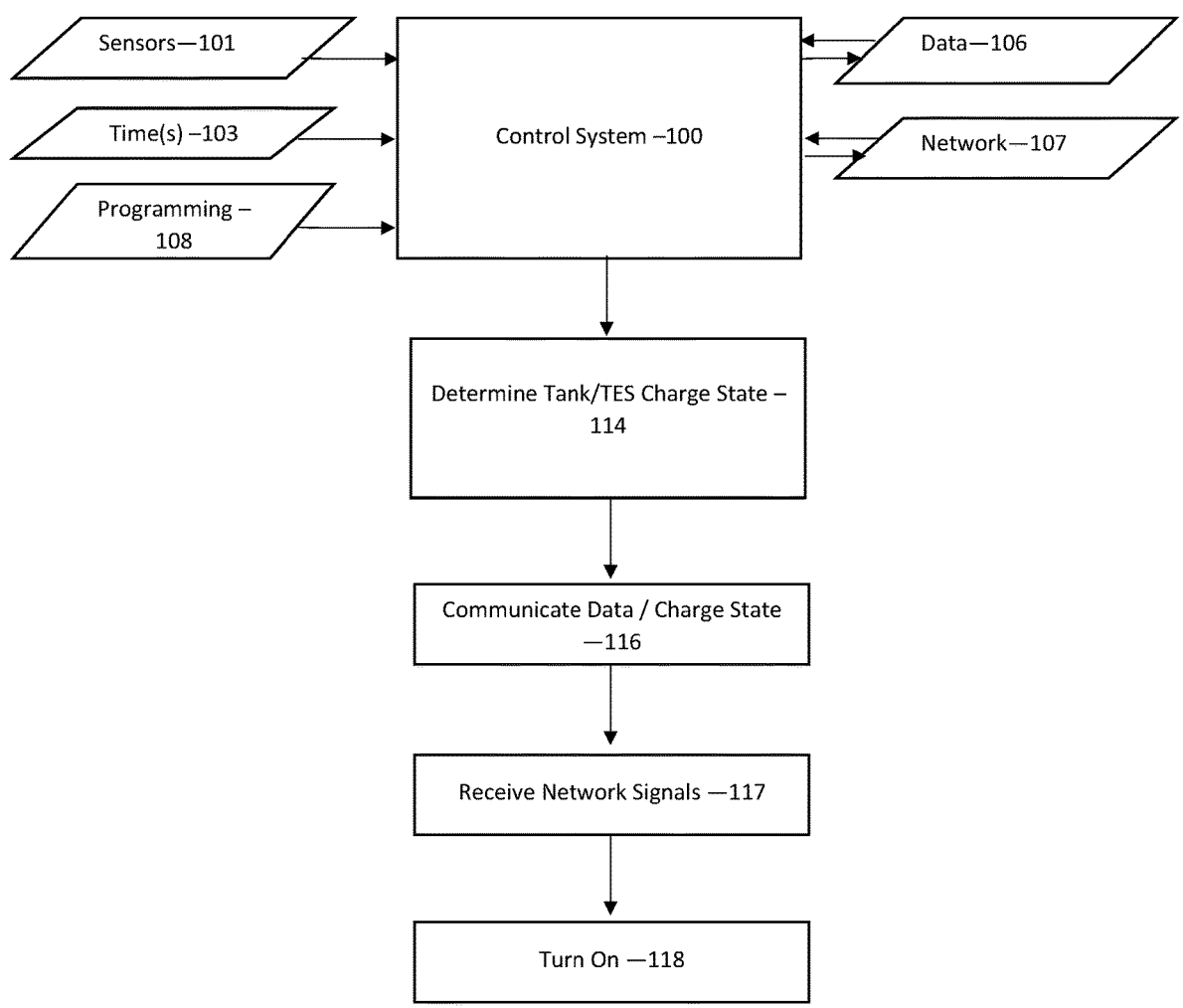
FIG. 11 illustrates a method in accordance with some embodiments.

FIG. 11 illustrates a method by which a control system 100 can determine when to turn on 118 a hot water heater and charge it with heat energy. The control system 100 receives data 106 from sensors 101, which may include time data 103. Optionally, the control system may determine the phase change temperature. From temperature readings alone, the control system may determine the tank/TES charge state 114, as disclosed herein. The method communicates the charge state, or other data 116 through the network 107. In an aspect, the data may comprise expected or instant electrical consumption, expected future load reductions, or any of the other data presently disclosed. The method then upon receiving a signal from the network 117 turns on 118 the water tank, or some elements of the water tank, for charging.

In an aspect, it is beneficial for a hot water tank to reach full capacity before electrical rates rise and/or the quantity of renewable power (or other desirable power) of the electrical grid diminishes. In a method, the control system recharges the tank upon determining a net out flow of heat energy above a threshold. In a method, the control system recharges the tank until a signal is received from a network, which may be the electrical grid, indicating that electrical power availability is declining and/or going up in price, or any reason the grid wants the electrical demand to shrink. In an embodiment, a control system of a hot water tank comprises at least two thresholds for determining when to charge the tank with heat energy. One of the thresholds is a minimum temperature threshold, wherein the tank will charge itself with heat energy regardless of the availability of inexpensive electrical power or excess grid power. Another threshold is a threshold indicative of tank storage capacity. Another threshold comprises an amount or threshold of heat energy which has been discharged. Another threshold comprises a rate of discharge.

In an aspect, a network that controls the electrical grid may comprise a "Stop" signal, wherein the electrical grid communicates to the water tank to not consume electricity even if the lower temperature threshold has been exceeded. In a further method, the grid may comprise a "Resume" signal or command to allow GIWH water heaters to return to turning on when the low threshold temperature has been exceeded. In this way, a grid can keep from being overloaded and more easily balance and protect itself.

In an embodiment, a hot water heater comprises two or more means of heating water in the tank. In an embodiment, one of the means is electrical resistance. In another embodiment, one of the means comprises using electrical energy, and another means comprising a fossil fuel source. In an aspect, a fossil fuel source, such as a propane or natural gas burner, can provide higher efficiency compared to an electrical source that is powered by fossil fuels. Provided renewable derived, or excess, or inexpensive electrical power is unavailable, the tank can switch to fossil fuel use. Further, this embodiment may provide hot water when the electrical grid is down or when it needs to not have the hot water heater consume electricity.

The control system may determine which sources of heat are used, or a combination of heat sources. The control system can determine this based on signals from the electrical power controlling network, and/or the availability and/or the cost of fossil fuels. In an embodiment and method, the power grid comprises at least one signal sent through a network that informs GIWHs that its electrical power is being generated by fossil fuel sources, and it may be more efficient for the GIWH to use its fossil fuel burner to heat its water. In another embodiment and method, the grid sends a signal comprising an amount of greenhouse gas generation for the current electrical supply. A GIWH can then determine whether to use its fossil fuel source.

In the embodiments comprising external TES, the control system knows the flow rate provided by the pressure increasing device (compressor, etc.). In an embodiment and method, the TES comprises two or more temperature sensors that provide the temperature going into the TES of the heat exchange fluid, and the temperature of the fluid upon exit. Using this data, the control system can determine the capacity of the TES to store or discharge heat energy. This data and determinations can be combined with temperature data of the water within the water tank to help determine when to charge the TES and/or tank, and may use some of the methods above.

In an aspect of power grids, a power grid can send signals indicating grid interactive water heaters (GIWH) of the present invention to use electricity and store this energy as heat energy. A signal, such as "Add Load" could be sent out over the power grid or other network. However, the amount of electricity consumed depends on several variables including the number of devices online, the rates at which they can consume electrical energy, and the total amount of storage available. If there are too many GIWHs, too much electrical energy could be consumed by a simple signal broadcast to all GIWH devices.

In an embodiment, each GIWH device of the present invention comprises data 106 comprising an identifying number, or other identifier. In an embodiment, each device determines or knows its storage capacity, which may comprise current and/or total capacity. In an embodiment, each device determines or knows its rate of electrical energy consumption. In an embodiment, each device communicates one or more of this data to the network. In an embodiment and method, the network determines which devices get signals to turn on and consume electrical energy, such as an "Add Load" command.

In an embodiment and method, a water heater of the present invention comprises a signal uploaded to the network that comprises data indicating when the water heater will stop consuming electricity. A use comprises notifying the network so the network can adjust and/or turn on (or off) other electricity consuming devices or electrical storage. These embodiments may further comprise two temperature thresholds. One that indicates that PCM in the TES has fully phase changed, and the other a maximum temperature that the tank should reach. Embodiments may further comprise a temperature threshold above a maximum user set temperature for the use of allowing the grid to temporarily consume more energy in times of need.

In an aspect of many of the embodiments of the invention, the consumption of grid electrical energy by a GIWH changes the electrical demand at a later time or date. In an embodiment and method, the GIWHs of the present invention may inform a network of expected future demand. This expected future demand can be determined from past usage patterns determined by the control system, or the network itself.

In an embodiment and method of the invention, the control system of the GIWHs of the present invention comprises determining future changes in the price of electricity. This can be determined from signals from the network, and/or it can be determined from past behavior of the network. GIWHs can determine when to turn on or off based on these determinations.

In an aspect of electrical grids, grids may comprise both load and storage devices. Many of the GIWH embodiments of the present invention are load devices, but they also comprise heat storage for later use. While this is different from grid storage devices that can return electrical energy at a later time, the storage in many of the present embodiments reduce electrical loads at later time. In an embodiment and method, a GIWH notifies the grid controlling network by sending data comprising the type of storage device, or the expected future electrical needs of the devices to enable the grid to determine what type of devices should be started. In an embodiment, the data comprises both energy usage amounts and time intervals during which the energy is expected. In an embodiment, the data is data of past usage and time intervals from which the grid network can determine expected future electrical demand.

For example, if a GIWH of the present invention is determined to lower the overall consumption and/or generation of electricity in the future, it may be given priority over a common storage device to be started. In an aspect, a common storage device that returns electrical energy will only return a portion of the energy consumed, as they are less than 100% efficient devices. A GIWH that returns a higher overall percentage of energy would be preferable to a storing energy than a common storage device, such as a battery, to then use that stored electricity to later power a GIWH. In another aspect, priority to devices may be determined by which devices maximize profit or reduce costs for the grid and/or the user of the GIWH. For example, a common storage device may be paid to return electrical energy to the grid. While some of the present embodiments do not get paid to use their stored heat energy and there may be an economic advantage to turn them on to store heat. It can be economically preferable to store heat energy directly, than to pay for electrical storage—which then powers a GIWH with its returned electricity.

In another embodiment and method, the GIWH device of the present invention comprises a number in a range of numbers, which can be preprogrammed or set in another manner, such as through a random number generator, which can be seeded with information from the network at the time of startup, or another time. In this method, a network controlling the device can send a number as part of a start command, and/or a range, and if the device's number matches the number, or is within the range, the device will start up and consume electrical energy. A network for controlling GIWHs can then just generate a random number, and send a signal comprising the random number and/or a range, and then determine how much electricity use comes online. The network can then send more signals until all the excess electrical energy is consumed. In a further method, the network can send signals to stop in a likewise method. The network can over time learn the storage capacity and rates of devices and adapt to learn how much capacity is available for each number and/or range, which can be exclusive to each device having to register itself with the network. The network can generate random numbers to randomize the opportunity for each device to have an approximately equal chance to consume inexpensive or free electrical energy.

In another embodiment, devices may bid for electricity and an electronic bidding system may be incorporated. Some of the previous methods and embodiments may be combined.

In an embodiment, a GIWH learns from past days when to expect to turn on and charge. In an embodiment and method, the GIWH uses a calendar to learn weekly, monthly, and/or yearly cycles. For example, the GIWH heater can learn, or be programmed, to know that weekends have different times of inexpensive or lower carbon available electricity from weekdays.

In another embodiment and method, a power grid network cycles through a series of devices. The network may store the last device, or the next device to be sent signals. The next time the grid needs to adjust its power consumption and/or generation, the network will begin notifying the next devices in the series. Over time, each device will have an approximately equal opportunity of receiving commands to consume electrical power, which may be less expensive.

Heat Pumps

Heat pumps can be used to provide heating for the water in the hot water heater, and/or to a TES device. FIGS. 2-4, and 8 Illustrate embodiments for the use of heating water 13 comprising one or more heat pumps. These figures illustrate embodiments comprising a pressure increasing device, such as a pump or compressor 22, a heat exchanger 19, such as a condenser, a pressure reducing device 21, such as a throttle, and a thermal energy storage device (TES) 7.

In this case, heat energy is added at both the heat exchanger 21 Q(1) and the TES 7 in general operation. This heat energy is then transferred Q(2) to the water heater 1.

Figure 4:
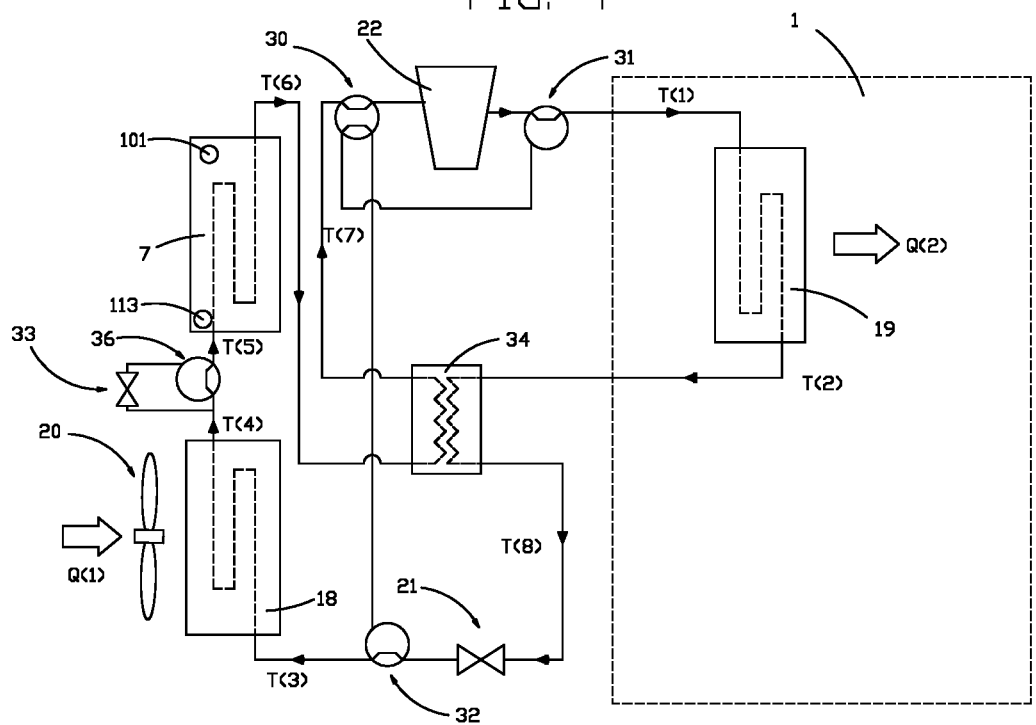
FIG. 4 illustrates a hot water heater heating system in accordance with some embodiments.

FIGS. 2-4 illustrate embodiments comprising a TES 7 that is external to being in direct contact with the water in the water tank. In these embodiments, the TES is only in heat transfer contact with the fluid that is being circulated through the heat pump to move heat energy to the water in the water tank. An advantage to this is that there is no danger of any of the materials of the TES, which may include PCM chemicals, leaking into the water supply. Another advantage is that the melting point of phase change materials (PCM) in the TES does not have to be within the temperature range that the water in the hot water tank needs to be maintained at. Thus, a wider variety of phase change materials may be used.

FIGS. 2 and 3 illustrate an embodiment and example comprising a TES 7 that is inserted between the heat exchanger 18 and the pressure increasing device 22. In this position the purpose and use of the TES is to further raise the temperature of the heat transfer fluid before it is compressed. Provided heat energy has been previously stored in the TES and temperature T(6) has been increased from temperature T(5) from the fluid flowing through the TES, the temperature at T(1) will be increased from what it would have been without the TES. Heat exchanger 19 will then transfer more heat energy into the water of the hot water tank as more heat energy is in the fluid, as it is at a higher temperature upon entering this heat exchanger. This makes the cycle more efficient, and heat energy stored in the TES is then transferred to the water in the tank.

In an aspect, heat pumps are commonly used to heat hot water heaters, but it is not common for the heat pump cycle to comprise a TES inserted between heat exchanger 18 and the pressure increasing device 22.

In an aspect, heat pumps for heating water generally comprise reverse Rankine cycles which utilize a refrigerant fluid that phase changes. FIGS. 2-6 comprise common symbols for the parts of a heat pump. In an embodiment, the heat pump comprises a reverse Rankine cycle and the pressure increasing device is a pump 22. The pressure decreasing device is a throttle or capillary tube 21, the heat exchanger 19 is a condenser, and the heat exchanger 18 is an evaporator.

In alternative embodiments, the heat pump comprises a reverse Brayton cycle that uses a fluid that does not phase change, such as air. In this case, the pressure increasing device 22 may be a compressor, the pressure reducing device 21 may be a turbine, and the heat exchangers are not devices where significant condensation or evaporation takes place. In these embodiments, the compressor is generally linked to the turbine by a shaft, but it can be by any means to transfer work energy from the turbine to the compressor, as is commonly done. Or, the turbine can comprise an electrical generator and the compressor can comprise an electric motor and an electrical connection can transfer the work through electricity between the two pressure changing devices.

In an aspect of the embodiment, an embodiment may comprise a plurality of thermal mass energy storage units (TESes) and/or a plurality of different heat energy storage materials with different melting points.

FIGS. 2 and 3 illustrate embodiments with the TES as part of the heat pump cycle. These figures also illustrate means for charging the TES with heat energy. These means comprise a plurality of valves that change the direction of the heat transfer fluid. In FIG. 2, the valves direct the fluid in the normal direction for heating the water in the tank. Fluid is pressurized by the pressure increasing device 22, and then flows through heat exchanger 19 which delivers heat to the water in the tank. The fluid then flows through the pressure reducing device 21 to lower the pressure and temperature. The lower temperature fluid T(3) enters heat exchanger 18 which absorbs heat from the outside air. From there the fluid flows though the TES which further heats the fluid, if it is charged with heat, before completing the cycle.

In FIG. 3, the positions of valves 30 and 31 are changed to direct the fluid to flow in the reverse direction and immediately enter the TES 7 first after being pressurized by the pressure increasing device 22. These can be referred to as reversing valves. In this case, the fluid has had its temperature increased and heat energy will be transferred into the TES. Upon flowing out of the TES, the position of valve 36 is changed to direct the fluid to a pressure decreasing device (such as a throttle) 33, thus lowering the pressure and temperature of the fluid which then passes through heat exchanger 18. The position of valve 32 is also changed to now redirect the fluid that has just gained heat energy back to the pressure increasing device.

In an aspect of these embodiments, valve 31 can be omitted, as pressure would build up from valve 32 being open and the fluid would still flow in the correct direction. But the illustration is clearer to view the operation with valve 31 included. In another aspect, any common method of reversing fluid flow to charge the TES may be used. Further, the TES may have its own charging system for adding heat.

Figure 7:
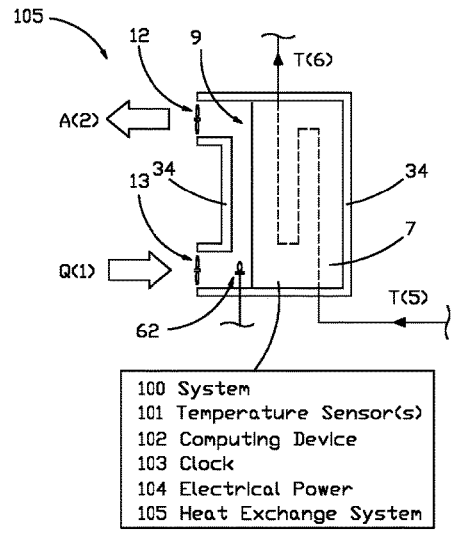
FIG. 7 illustrates a TES in accordance with some embodiments.

In an aspect of the invention, the TES 7 may comprise means for heating the TES separate from the main heat pump that is used to directly heat water in the hot water tank. FIGS. 5-7 illustrate TES devices with separate heating means, which may comprise a heat pump, or other common methods of heating materials.

FIG. 5 illustrates a reverse Rankine heat pump. FIG. 6 illustrates a reverse Brayton cycle heat pump. And FIG. 7 represents using fossil fuel burner, or other common means such as electrical resistance to add heat energy to the TES.

In an aspect of the invention and embodiment, a thermoelectric heat pump comprises the direct heating source for heating a TES. Thermoelectric heat pumps are not as energy efficient as the above listed heat pump types. But they are low cost and could be added to consume excess electricity and turn it into useful heat. In an aspect, if the TES is external and sits long enough, it will lose its stored heat. But even if it lost all of its stored heat it would not negatively impact the functioning of the main heat pump cycle, as it would not reach a temperature lower than the ambient air source.

In an aspect of using heat pumps for heating, the evaporator, or cold side heat exchanger, is sometimes in a cold environment. It is generally known that heat pumps do not function well when ice condenses of the evaporator coils during cold weather. There are known solutions, such as reversing flow temporarily to melt the ice. In an advantage of adding a TES to a heat pump cycle, the TES can provide heat input to the system during times when the evaporator's function of absorbing heat is diminished through ice buildup.

In an aspect of heat pumps for heating, auxiliary means of providing heat are often provided for very cold weather, such as switching to using fossil fuels, or electric resistance for heating. In an advantage to a heat pump cycle with a TES, the addition of a TES can extend the times the heat pump can be used for heating, and reduce the times an auxiliary method of heating is used. Also, a heat pump cycle embodiment of the present invention with a TES will be more efficient, as the TES transfers heat energy to refrigerant of the heat pump cycle which in turn provides more heat to the water heater. So, these embodiments can maintain an efficiency and monetary advantage over auxiliary methods of heating down to colder temperatures than a traditional heat pump cycle.

FIG. 7 illustrates an embodiment wherein a fossil fuel burner can add heat to the TES 7, which in turn can add heat through the main heat pump system to heat the water in the tank even when the coils of the heat exchanger 18 have frosted over.

In an aspect, the TES having a separate heat pump adds equipment, but the overall COP of the system can be reduced, as the temperature difference between the ambient air and the TES, and the temperature difference between the TES and the water in the tank can be lower than the difference between the ambient air and the water in the tank. Effectively, moving heat energy into an external TES that is at a lower temperature than the water in the tank makes for a cascaded heat pump system, which is more efficient. This is also true for the embodiments which use the main heat pump for charging the TES (FIGS. 2-3).

In an aspect, a solar collector may be used to provide heat to heat and charge the TES. In an embodiment, a solar thermal collector provides heat to the one or more TESes illustrated in FIGS. 2-7. In an aspect of these embodiments, water from the solar collector only needs to be warm enough to raise the temperature of the TES, which may be a lower temperature than the hot water in the water tank. Thus, the solar collector may provide heat energy throughout a wider time range of the day.

In an aspect, a solar thermal collector of these embodiments only needs to provide some of the heat energy, as heat exchanger 18 provides the rest. In an aspect, the solar collector may be a PV panel that then drives a heat pump.

FIG. 4 illustrates an embodiment for the use of heating that includes a regenerator 34. Regenerators are a common device in some devices for the use of refrigeration, and in this embodiment a regenerator lowers the temperature at T(8), which in turn lowers the temperature at T(3). A lower temperature at T(3) enables heat exchanger 18 to absorb more heat. The regenerator 34 transfers heat energy which causes T(7) to be hotter than T(6). T(6) being hotter causes T(1) to be hotter, which then enables heat exchanger 19 to output more heat for a given pressure differential to the system. Regenerators can also lower the pressure ratio for a comparative COP and heat transfer. In this figure, the regenerator is upstream of the TES. But the regenerator can be placed downstream, or two regenerators can be used with one upstream and one downstream. In an aspect of the invention, one or more regenerators can be added to other embodiments of the invention without departing from the scope of the invention. A regenerator is an option that is not shown in some of the other drawings as it would needlessly clutter the drawings.

In an embodiment, the embodiment comprises a heat pump with a regenerator and no TES in the heat pump cycle. In an embodiment, the embodiment comprises a TES in the water tank in direct contact with the water in the tank, and a heat pump with a regenerator and no TES in the heat pump cycle.

TES Materials (PCMs and/or Other Thermal Mass)

The TES of the present invention comprises one or more materials suitable for storing thermal energy. Many materials for storing thermal energy exist and are common. Some common materials comprise paraffins, eutectic salts, water, antifreeze, rock, earth, and so on. Some of these materials are phase change materials (PCMs) which are desirable as latent heat transfer during a phase change occurs at a constant temperature, and a smaller amount of material is required to hold a given amount of heat energy.

PCM's are generally preferable. However, non-phase change materials may be readily available at the site of the water heater. For example, earth is almost always available. In existing ground source heat pump systems, earth is often used as a TES. A water source, such as a pond, is also used sometimes.

In an embodiment, the TES comprises earth. In an embodiment, the earth used is insulated from at least the top surface. As the amount of earth necessary for a daily cycle TES system is relatively small, deep drilling is unnecessary. However, the top few feet of earth normally experience temperatures at, or close to the current daily temperature, instead of temperatures close to the yearly average—that a deep well would provide. So, it is preferable to insulate the earth from at least the top, and heat the earth that comprises the TES in at least one of the same ways as the other embodiments of the invention.

In an embodiment, the top surface of the earth, that comprises the thermal mass of the TES, is covered with insulated glass. Wherein the insulated glass may comprise a plurality of sheets of glass with an insulating gas or vacuum or partial vacuum between layers. The insulated glass may also comprise vaulting between layers that connect with slender columns and provide a vacuum, or partial vacuum between. In this embodiment, radiant energy is allowed to pass, but conduction and convection heat exchange is significantly retarded.

Another embodiment comprises at least two materials with different radiant absorption and emission rates. The emission of radiation from a surface is often referred to as radiant exitance or radiant emittance. In this embodiment, the material with greater radiant absorption rates is moved to be struck by incoming radiant energy, such as rays from the sun, during the day to heat up when it is desirable to heat the TES up. At night, the material with a low emission rate is moved so that radiant energy is not lost from the TES.

In an embodiment, the TES is heated by a selective surface with a high absorption rate and a low emission rate. Such materials are in common use in solar heat collectors.

In an embodiment, a material that is transparent is used on the top cover. In an aspect of some embodiments of the invention, glass is generally transparent to visible light radiation, but opaque to infrared radiation. However, glass generally emits the same as it absorbs. Thus, a glass cover would absorb infrared radiation radiating out of the TES, but it would then re-emit some of the radiation. In an aspect, covers can also be placed over a TES.

In an embodiment, a TES comprises a packed bed of material, such as rock. Packed beds are common in the art of thermal storage. It is also common to reverse flow of a fluid, such as water or air, between charging and discharging to maintain fairly constant temperature outputs. A packed bed may use less expensive materials, and/or be better for the environment.

In an embodiment, a packed bed comprises refrigerant as the fluid circulating throughout the bed to transfer heat in and out of the packed bed.

Similarly, a TES comprising phase change materials (PCMs) often use a fluid to circulate within the TES to transfer heat energy. It is also common for the PCM to be encapsulated, sometimes in plastic, sometime micro-encapsulation. It is common for a fluid to circulate, whether by a pump or by natural convection. Provided the PCM is in direct contact with the water in the hot water tank, the PCM should be encapsulated within a material that does not put harmful chemicals into the water. Further, the material should not corrode. Example materials are copper and glass. Copper is a preferable material as it has a high conductivity.

In an embodiment, the fluid used to transfer heat into and out of a TES for the use of heating the TES is a refrigerant. In an embodiment, the refrigerant is the same refrigerant as is heated by the TES. That is to say, there is no separation between the refrigerant of the heat pump system that heats the water tank for the TES. In this case the phase change material is a different material from the refrigerant, which is also a phase change material. In an aspect, it uses much less space to have the phase change material be a material that changes between liquid and solid, whereas refrigerant changes between liquid and gas.

Installation

In an aspect of the invention, existing devices and infrastructure can be modified to become embodiments of the present invention. For example, a TES can be added to an existing water heater system. A TES can be added by more than one method.

One method is to add microencapsulated phase change materials to an existing hot water heater. The capsules can be added by removing and/or unscrewing a sacrificial anode and inserting the capsules through the open hole before reinserting the sacrificial anode.

Another method is to add a preheating tank to an existing hot water heater.

Hydrogen Embodiments

Figure 8:
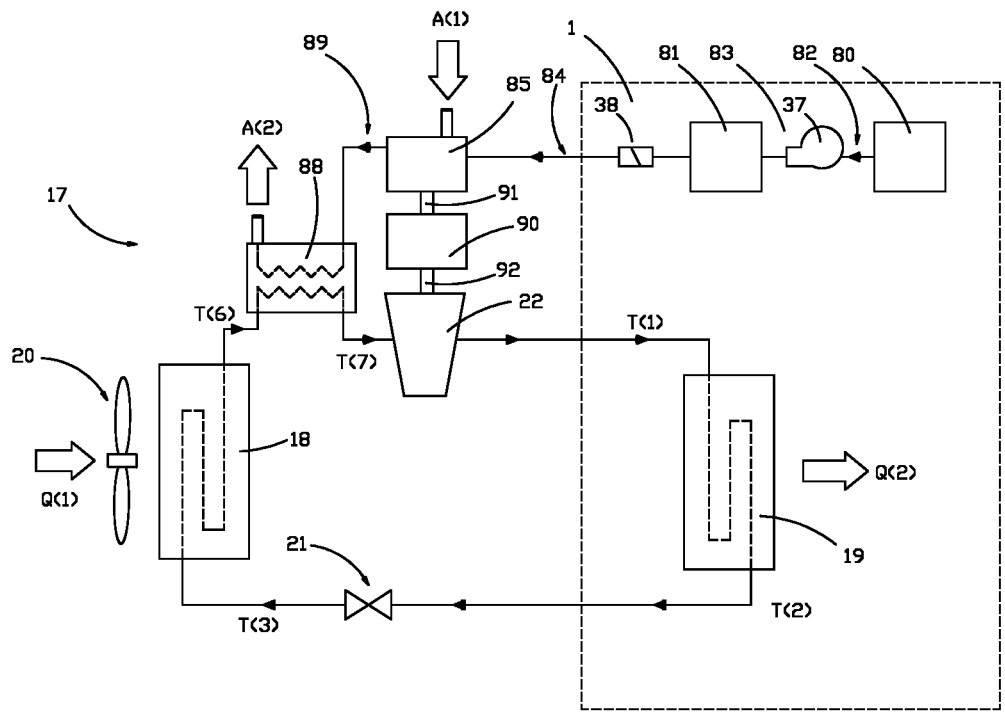
FIG. 8 illustrates a hot water heating system in accordance with some embodiments.

In an embodiment, a hot water heater comprises a plurality of devices to use electrical energy to make hydrogen, and to later use the hydrogen to add heat energy to the water heater. FIG. 8 illustrates an example embodiment comprising a device to separate hydrogen from oxygen using the available water 80, a tank to store the hydrogen 81, a device to move the separated hydrogen into the storage tank 82, a device to move the hydrogen back out of the tank after storage, a device to convert the hydrogen back into water using available air into usable work or electricity 85, and a heat pump 17 to use the work or electricity to move the heat generated by the step of converting hydrogen and air back into water and output the heat into the water heater (comprising 22, 19, 21, 18, and 88).

Devices to separate hydrogen from oxygen using the available water are common and some examples are electrolysis, solid oxide electrolyser cells (SOECs), polymer electrolyte membrane cells (PEM), and alkaline electrolysis cells. Some embodiments may be exclusive from or exclusive to this list of alternative elements.

In an aspect of the embodiments that use hydrogen storage, using hydrogen to store energy is known, but it is generally inefficient due to waste heat that is generated in producing hydrogen, storing hydrogen, and in turning the hydrogen back into water. However, a hot water heater can utilize the heat generated in these basic steps. Steps comprising cracking water and reforming water can be used to heat the water in the water tank. The heat generated by all these processes can be used in a hot water heater, and not wasted. Also, the water tank comprises a source of water, by definition. Provided the step of separating water into its components is done within the tank, the heat generated by this process goes to heat the water in the tank, and is not wasted.

The heat generated from the step of recombining hydrogen with oxygen can be used as a heat source for the heat pump which moves the heat energy into the tank. The step of recombining hydrogen and oxygen can be done with a combustion engine, a fuel cell, or any other common means. Some embodiments may be exclusive from or to this list of alternative elements. The device used for this step may use the available air, which comprises both the oxygen required for the step, and nitrogen (in the form of $N^2$). Considering that the exhaust of the step of recombining water comprises primarily hot nitrogen and water vapor, the heat pump can run at a relatively high COP as heat is moved from a hot exhaust to hot water, which may be cooler. The exhaust outputted from the heat exchanger may then be cooler than the incoming air, which is the input to the recombing and heat exchanger steps. Thus, turning excess electricity into hydrogen to store energy for later use can add more total energy (as heat energy) to the hot water tank than was initially consumed, as the heat pump moves some "free" heat energy into the tank from the air by the heat pump.

For example, if the step of making hydrogen is 70% efficient in terms of the energy potential the hydrogen comprises to turn it back into work, then 70% of the original electrical energy used is available for use in the stored hydrogen. In an aspect, the 30% "waste" heat is added to the water tank and is not wasted. Also, hot water often makes this step of splitting water more efficient. Also, for the purpose of providing an example, we will assume that with an engine or fuel cell 30% of the 70% is recovered in the step of recombining water as work energy output. If so, then the work energy available to the heat pump is 21% (70%×30%) of the original electrical energy consumed. Considering that the heat pump moves heat from a hot exhaust to the generally hot water in the tank, a high COP is expected, if we assume a COP of 5, then the heat energy added to the tank by the heat pump would be 105% (21%×5) of the original electrical energy input. A COP of 8 would deliver 168%. To get the overall heat added though, the 30% waste heat energy of the first step of separating water has to be added in. However, the steps of storing and retrieving the hydrogen have to be considered.

In an aspect of the example and embodiment, an internal combustion engine running at a constant load and unthrottled can generally achieve an approximately 30% efficiency. A fuel cell can do much better, so it is possible to attain a higher overall efficiency.

Figure 10:
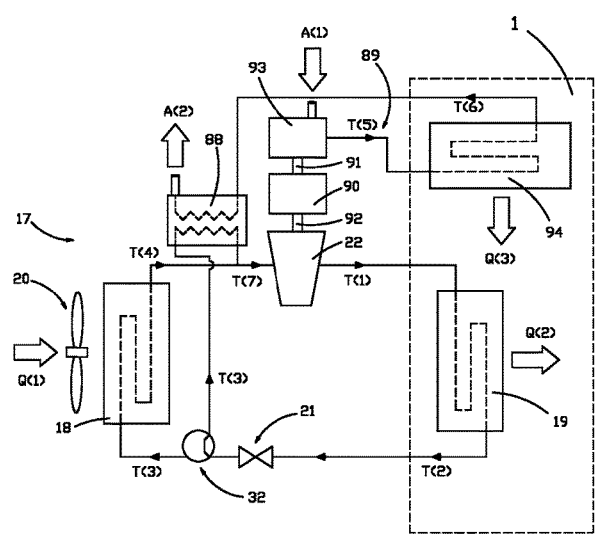
FIG. 10 illustrates a hot water heating system comprising CHP in accordance with some embodiments.

In an aspect of the example and embodiment, the exhaust from the step of recombining hydrogen with oxygen may first be routed directly to a heat exchanger in the tank, similar to what is illustrated in FIG. 10. Thus, some exhaust heat is directly conducted into the water of the tank before it enters the heat exchanger 88 that exchanges heat with the fluid of the heat pump. In an aspect, a thermoelectric heat pump may be used, in which case the heat is exchanged with a heat sink that moves the heat directly into the water of the tank in a second heat addition step.

In an aspect, the uses of the hydrogen embodiments are the same as the other embodiments of the present invention, which comprise storing excess electrical energy for later thermal or electrical use, and/or using electrical energy that is provided at a lower cost than it will be at a later time. Thus, the amount of hydrogen needed to be stored generally does not require using a high-pressure tank. If the tank is pressurized, the pressurized tank should reside in the water heater where the heat of pressurization will heat the hot water in the tank and not be wasted. Hydrogen storage that uses materials that absorb hydrogen are known, and can store hydrogen at moderate pressures. In an aspect, the hydrogen could be stored in the same tank as the water.

In an aspect, the hydrogen creation and use devices can use their own heat pump system, or they can be integrated into a heat pump that is also for the use of heating the hot water heater when stored hydrogen is not used. FIG. 8 illustrates the second embodiment. However, if heat exchanger 18 is removed, then FIG. 8 represents the first embodiment. Also, in the first embodiment, the "free" energy can come from heat exchanger 18, while in the second embodiment the "free" energy can come from heat exchanger 88. However, it is possible to place these heat exchangers in serial or parallel configurations, or to use a method of valving between them, as illustrated in FIG. 10. These heat exchangers can also be combined into one device with the source of heat input being the ambient outside air and/or the exhaust heat, if available.

In an aspect, hydrogen can store more potential heat energy per mass than the embodiments that use phase change materials, or store sensible heat. In an aspect, these embodiments may be combined with the embodiments that use TES and phase change materials.

In an aspect of the hydrogen embodiments, as illustrated in FIG. 8, an electric motor and/or generator 90 can be added between the engine or fuel cell that combines hydrogen 85 and air and the pressure increasing device 22. The motor/generator can be coupled with shafts 91 and 92. These can further comprise common clutches. In an embodiment, the engine can drive the generator to produce electricity. In another embodiment, the motor can use electricity to drive the pressure increasing device. In an aspect, an embodiment may combine these devices in any combination to provide flexibility to produce or consume electricity in, or not in combination with combining hydrogen and oxygen from the air to produce either heat energy or electricity.

In an aspect, some of the present hydrogen embodiments comprise cogeneration. A control system of the water heater can determine if electrical or heat energy, or some percentage of each should be returned. The control system may determine this from the determinations and data previously disclosed.

In an aspect, the TES features and embodiments disclosed above may be combined with the embodiments illustrated in FIG. 8. They have only been left out of the drawing for clarity, as they would unnecessarily clutter the drawing. For example, the water tank could comprise TES and PCM. In another example, a TES could be external to the water tank, and it could be charged with excess electricity, or from the heat engine storing heat for later use. In an embodiment, the TES is immediately downstream of both heat exchangers 18 & 88.

Combined Power and Heat (CHP)

In an embodiment, a hot water tank comprises a heat engine, and the heat engine is connected to an electrical generator to produce electrical power from the heat energy that is converted into useful work. The waste heat is then utilized to heat water. This part is known in the art as CHP (combined heat and power). However, this embodiment also comprises a heat pump for the novel use of moving heat energy that would normally be wasted in the heat engines exhaust.

FIG. 10 illustrates an embodiment comprising a CHP water heater with the addition of a heat pump 17. A heat engine 93 is connected to a generator 90. The heat engine may comprise any common heat engine, such as an internal combustion engine, a fuel cell, or an external combustion engine, such as a Stirling engine. The generator may also comprise a generator/motor which can switch between transferring work into electricity and transferring electricity into work. The engine and generator (generator/motor) are often connected via a shaft 91, but may be combined. The shafts in some embodiments may comprise one or more clutches to connect or disconnect the devices.

FIG. 10 represents a plurality of embodiments. In a first embodiment, the heat engine drives the generator. The waste heat, which is contained in the exhaust is first routed to a heat exchanger 94 which resides in the water of the water tank 1. This transfers some of the heat of the exhaust into the water, thus heating the water tank. After the exhaust exits heat exchanger 94, the exhaust is routed to a second heat exchanger 88. This may comprise a crossflow heat exchanger, but is not limited to this type. The temperature of the exhaust exiting the water tank cannot be below the temperature of the water, and there is, thus, heat energy that is wasted in prior art CHP embodiments. In this embodiment, some heat energy of the exhaust is transferred to a fluid of a heat pump 17.

In an aspect, the heat pump may comprise a type that does not comprise a fluid, such as a Peltier heater, or thermoelectric heat pump, which is a solid-state device. In such case, the heat is transferred from one heat source to another. The thermoelectric heat pump may comprise and a through-chamber heat sink to conduct heat into the water.

Pump 22 of the heat pump then raises the pressure of the heat pump fluid that has been warmed by the exhaust heat that was transferred to it, which in turn transfers the heat energy into the water of the water tank as the water passes through heat exchanger 19.

In an aspect, heat pumps that operate at small temperature differentials can be very efficient and operate at COPs of 5 or greater. For example, and to illustrate the operation, let's assume the heat engine operates at 25% efficiency of 100 units of heat energy that went into the heat engine. The work output of the heat engine is transferred to the pump, which in turn, and in this embodiment, drives a heat pump cycle. Thus, the pump uses 25 units of work energy to drive a heat pump with a COP of 5. Thus. this will move 125 units of heat energy into the water tank, which is 25, and 25%, more energy than an ideal combustion-based or furnace-based water heater can provide. However, this does not include the additional heat energy that was transferred directly into the water heater through conduction through heat exchanger 19, which is considerable. In this example, the exhaust temperature exiting the system can be lower than the intake air temperature into the engine, in which case "free" energy is added from the airstream. This is a significant advantage to the combination of conventional CHP and a heat pump, which is a novel combination. A conventional CHP cannot have more energy output from the system than the chemical energy potential of combustion input into the system. But the present invention can, as it adds another energy source.

In this last example, work energy is transferred directly from the heat engine to the pump, which bypasses the electrical generator. In this case, 100% of the work/power generated by the heat engine went to power the pump of the heat pump. In the case where electrical power is not needed, this is desirable. However, there are times when electrical power is desirable, as well as a variety of situations with different demands.

In an aspect and embodiments, some embodiments of FIG. 10 represent a grid enabled hot water heater (GIWH). These embodiments have features of previously described embodiments, such as a control system that can receive signals to modify the operation of the water heater. A power grid may send signals to the water heater to add load, and thus consume excess electricity. It may send signals to generate electricity. It may also send signals to a water heater to add heat, so as to avoid electrical or fuel consumption and demand at a later time and/or date.

FIG. 10 illustrates some embodiments where the heat engine, the electrical generator (generator/motor), and the heat pump's pump may be coupled, or uncoupled. The connections between these devices may be mechanical, or electrical. An example of a mechanical coupling comprises one or more axels and clutches, which are known in the art. An example of electrical coupling is a heat pump's pump that is electrically driven by the electrical output of a heat engine and generator. This is also within the skill in the art to make this connection. Thus, these embodiments can have different modes of operation to both satisfy the grid, and the needs of providing hot water. Further, it can lower carbon emissions, as will be discussed.

In an aspect of power grids, renewable energy often does not provide consistent power. Non-renewables can provide more consistent power, but electric demand is not consistent. Power girds often utilize back up fossil fuel sources, such as gas-fired peaker plants. In some of the present embodiments, the heat engine drives the electrical generator to produce electrical power for the grid. (In an aspect, the electrical generation is not limited to the grid, but may be used by a home, or off-grid application.) The heat pump's pump may consume all, none, or some of the power/work output of the heat engine. In the case of some or all of the power, the electrical generator can supply the grid with electric power. A fleet of these hot water heaters can replace other power sources, such as peaker plants.

When the heat pump uses none of the power from the heat engine, the water heater will operate as does a conventional CHP water heater. When the heat pump exclusively uses the power from the heat engine, it operates exclusively as a hot water heater, although an extremely efficient one. When the heat pump uses some of the work/power from the heat engine, the unused portion can be used to generate electric power from the generator. In an aspect of the invention, any common means to vary the proportion of work/power delivered may be used. In an aspect of the invention, the functions of the devices may be replaced with a plurality of devices. For example, the electric generator may comprise two or more generators that can be switched from generating electric power to not through electric means—by switches. In an example, electric generation comprises two electric generators, with one having a capacity twice the other. If the output of one of the generators is 1 unit, with the other 2 units, then for this case, the outputs can be 0, 1, 2, or 3 units. 3 units is when both generators are working together. The number of power levels can be $2^n$, with n being the number of generators, each being twice as powerful as the last.

In another case, the heat pump can be run with power from the electrical generator/motor, which in this case is running as a motor. In this case, electrical energy is supplied from the grid, or other electrical source. In this case, the hot water heater operates as a load device which consumes electricity. It operates as a heat pump water heater. In this case, valve 32 may be switched to run the heat pump fluid through heat exchanger 18. Thus, some of the present embodiments provide several benefits to an electrical grid to balance itself. A power gird can send signals to the water tank not only add load or to generate electricity, but it can also send signals to store heat to manage future needs, as disclosed above. A grid can determine how best to minimized CO2 generation, and/or to best lower costs. A control system of the water heater can also make decisions to best manage impact or costs, given future predicted needs or costs, or other data which may come from signals from the grid.

FIG. 10 illustrates a valve 32 that can divert the heat pump fluid flow in different directions. As illustrated, flow can be directed through the heat exchanger 88 or heat exchanger 18. In the case where the heat pump is driven by the heat engine, the flow is directed through heat exchanger 88. In the case where the heat pump is driven by the electrical motor 90, the flow is directed through heat exchanger 18. However, it is possible to place these heat exchangers in serial or parallel configurations, or to use a different method of valving. In an aspect, these heat exchangers can be combined into one device with the source of heat input being the ambient outside air and/or the exhaust heat, if available.

In an aspect, the embodiments that comprise heat engines can be used when the power grid is down, or any time electrical energy is not available. This is an advantage over conventional electrical water heaters that cannot generate hot water when the power grid is down.

In an aspect, the TES features and embodiments disclosed above may be combined with the embodiments illustrated in FIG. 10. They have only been left out of the drawing for clarity, as they would unnecessarily clutter the drawing. For example, the water tank could comprise TES and PCM. In another example, a TES could be external to the water tank, and it could be charged with excess electricity, or from the heat engine storing heat for later use. In an embodiment, the TES is immediately downstream of both heat exchangers 18 & 88.

In an aspect of power plants, such as peaker plants, they do not make use of the waste heat from combustion. Embodiments of the present invention illustrated in FIG. 10 do make use of this normally wasted heat. They further make more effective use of the waste heat than conventional CHP units do when at least some of the work energy extracted from the heat engine is used to drive a heat pump. By comparison, a conventional heat engine power plant, such as a coal or gas-fired natural gas power plant emits not only waste heat into the atmosphere, but they emit more carbon dioxide than the present embodiments. The reason is that the amount of electricity required to heat a tank of water from a conventional power plant is greater than the electricity needed from one of these present embodiments that partly heats the tank with exhaust heat that would be wasted in the conventional power plant. The present invention and embodiments need to generate less electricity to make the same amount of hot water, and thus burn less fuel to do so—generating less CO2.

In an aspect, adding the step of a heat pump cycle to move heat energy from the exhaust of a heat engine can be applied to devices beyond a hot water heater. It can be applied to anything that needs to be heated, such as a dwelling, vehicle, or industrial process.

In an aspect of the present embodiments, the heat engine can drive the electrical generator and, thus, replace the function of backup electrical generators. This can be for homes, buildings, or any use.

SUMMARY, RAMIFICATIONS, AND SCOPE

The embodiments, methods, examples, and aspects of the embodiments and invention are disclosed herein to summarize the invention and are not intended to limit the scope of the invention.

The present disclosure generally relates to using electricity to store heat energy for current or later use. The disclosed hot water heater embodiments and methods reduce or eliminate the deficiencies and other problems associated with hot water heaters, GIWH hot water heaters and, other load devices, as listed above. It is an object of some embodiments of the invention to store excess electrical energy for the later use of heating water in a hot water heater.

Further, some of the embodiments of the invention disclose methods of storing heat energy at a lower temperature than the temperature of the hot water in the tank. This avoids being limited to phase change materials that phase change withing the narrow range of hot water temperature in the tank. Further, the heat pump overall COP can be improved by these embodiments that move heat in a cascaded method, but asynchronously in regards to time.

A further embodiment makes and stores hydrogen for the use of heating water. Hydrogen can have a high storage capacity. Some of the hydrogen embodiments can return electrical energy. Another embodiment uses the exhaust heat from a heat engine to improve the overall efficiency over common CHP devices.

Many of the disclosed embodiments behave in a manner desired by the user or owner of the water heater, including reducing operational costs. Further, methods and embodiments comprising control and communication with a network for the use of balancing an electrical grid have also been disclosed. Further, embodiments comprising methods of insuring equal opportunity to consume less expensive electrical energy with similar devices, and an ability to favorably compete with common storage devices have been disclosed. Many of the disclosed embodiments also provide advantages to a power grid to balance the grid, protect the grid, decarbonize the grid, and allow the grid to avoid higher cost electrical generation.

The disclosure of the present invention as well as any references to preferred embodiments and other embodiments, are not for limiting the scope of the invention. Persons having ordinary skill in the art may make various modifications and changes without departing from the scope and spirit of the invention. Therefore, the scope of the appended claims should not be limited to the description of the embodiments described above. Accordingly, the scope should be determined not by the embodiments illustrated, but by the claims and their legal equivalents.

I claim:

1. A grid interactive hot water heating system comprising water, a control system, and a thermal energy storage, wherein the thermal energy storage comprises phase change materials, and wherein electricity is consumed to store heat energy in the thermal energy storage, and wherein the thermal energy storage heats the water; and wherein the control system comprises a computing device and is connected to a network, wherein the network sends three or more signals for starting and stopping one or more energy storage devices, wherein a first signal starts the grid interactive water heating system in priority over energy storage devices that return electrical energy to the grid, wherein the grid interactive hot water system charges the thermal energy storage in response to receiving the first signal.

2. The grid interactive hot water heating system defined in claim 1, wherein the phase change materials and the water are in direct thermal contact.

3. The grid interactive hot water heating system defined in claim 1, further comprising a heat pump, a fluid, and one or more heat exchangers, wherein at least one of the heat exchangers is upstream of the TES and exchanges heat energy with the fluid in the same direction as the TES.

4. The grid interactive hot water heating system defined in claim 3, wherein the heat pump system comprises a plurality of reversing valves, wherein the reversing valves reverse the direction of flow of the fluid when switched, whereby the heat pump system will move heat into the TES from the enclosed space in one direction, and when the valves are reversed, the heat pump will move heat into the water.

5. The grid interactive hot water heating system defined in claim 4, wherein the heat pump system further comprises a valve for the use of maintaining the position of at least one TES downstream of a heat exchanger and upstream of a pressure reducing device for both directions of the flow of the fluid.

6. The grid interactive hot water heating system defined in claim 1, further comprising a plurality of temperature sensors, wherein the computing device of the control system comprises instructions for determining a flow rate from the temperature sensors.

7. The grid interactive hot water heating system defined in claim 1, wherein the signals further comprise data, wherein the data comprising a state of the grid interactive hot water heating system, wherein the control system communicates the data to the network through the signals.

8. The grid interactive hot water heating system defined in claim 7, wherein the state of the grid interactive hot water system comprises an electrical consumption.

9. The grid interactive hot water heating system defined in claim 7, wherein the data further comprises a parameter indicating that the grid interactive hot water heating system does not return electrical energy to the grid, wherein the control system communicates the data to the network through the signals.

10. The grid interactive hot water heating system defined in claim 1, wherein the control system determines or estimates the storage capacity of the thermal energy storage.

11. The grid interactive hot water heating system defined in claim 10, wherein the control system determines or estimates the storage capacity of the thermal energy storage from a last time the temperature of the thermal energy storage was at a temperature different from a phase change temperature of the thermal energy storage and a calculated amount of a heat energy exchanged with the thermal energy storage since the last time.

12. The grid interactive hot water heating system defined in claim 1, further comprising a heat pump system, wherein the heat pump system comprises a TES heat exchange system for the use of charging the TES.

13. The grid interactive hot water heating system defined in claim 12, wherein the TES is are placed upstream of a regenerator.

14. The grid interactive hot water heating system defined in claim 1, wherein the hot water heating system further comprises a water separator, a hydrogen storage tank, and a water combiner.

15. The grid interactive hot water heating system defined in claim 1, further comprising a heat engine, and an electrical generator.

16. The grid interactive hot water heating system defined in claim 15, further comprising a heat pump and heat exchanger.

17. The grid interactive hot water heating system defined in claim 16, wherein the heat exchanger receives exhaust from the heat engine.

18. The grid interactive hot water heating system defined in claim 15, wherein the heat pump is powered by an energy output from the heat engine.

19. The grid interactive hot water heating system defined in claim 1, wherein the TES is placed upstream of a pressure changing device.

20. The grid interactive hot water heating system defined in claim 1, wherein the TES comprises a direct heating source for the use of charging the TES.

21. The grid interactive hot water heating system defined in claim 1, wherein the control system determines a state of charge of the thermal energy storage when the temperature of the thermal energy storage is at a phase change temperature.

* * * * *